United States Patent
Forrest et al.

(10) Patent No.: US 12,440,914 B2
(45) Date of Patent: Oct. 14, 2025

(54) PROCESS WIRE FEED DIAGNOSIS AND RECOVERY

(71) Applicant: GM GLOBAL TECHNOLOGY OPERATIONS LLC, Detroit, MI (US)

(72) Inventors: John Forrest, Grosse Pointe Woods, MI (US); Brian Dellamora, Sterling Heights, MI (US)

(73) Assignee: GM GLOBAL TECHNOLOGY OPERATIONS LLC, Detroit, MI (US)

( * ) Notice: Subject to any disclaimer, the term of this patent is extended or adjusted under 35 U.S.C. 154(b) by 884 days.

(21) Appl. No.: 17/695,297

(22) Filed: Mar. 15, 2022

(65) Prior Publication Data

US 2023/0294195 A1  Sep. 21, 2023

(51) Int. Cl.
*B23K 9/133* (2006.01)
*B23K 9/095* (2006.01)
*B23K 9/12* (2006.01)

(52) U.S. Cl.
CPC .......... *B23K 9/1336* (2013.01); *B23K 9/0953* (2013.01); *B23K 9/0956* (2013.01); *B23K 9/125* (2013.01)

(58) Field of Classification Search
CPC .... B23K 9/0953; B23K 9/0956; B23K 9/125; B23K 9/133; B23K 9/1336; B23K 3/063
See application file for complete search history.

(56) References Cited

U.S. PATENT DOCUMENTS

| | | | |
|---|---|---|---|
| 9,403,234 B2 | 8/2016 | Christopher et al. | |
| 2006/0131293 A1* | 6/2006 | Kaufman | B23K 9/124 219/137.71 |
| 2008/0296278 A1* | 12/2008 | Meckler | B23K 9/124 219/137.71 |
| 2014/0027429 A1* | 1/2014 | Chantry | B23K 9/173 219/137.7 |
| 2017/0165779 A1* | 6/2017 | Barhorst | B23K 9/125 |
| 2018/0361494 A1* | 12/2018 | Svendsen | B23K 31/125 |
| 2019/0255644 A1* | 8/2019 | Griffin | B65H 51/32 |

FOREIGN PATENT DOCUMENTS

JP  H09295141 A  11/1997

OTHER PUBLICATIONS

Technology for the Welder's World.; "MF3-Laser Front/Rear" BAL. 0511.0 • Jun. 13, 2019; ww.binzel-abicor.com (pp. 1-96).
Technology for the Welder's World.; "Troubleshooting MFS Wire Feeding Process" INT.9039 MFS Troubleshooting • Rev A 11-15; ww.binzel-abicor.com (pp. 1-20).
Chinese Office Action for Chinese Application No. 202211285756. 6, dated May 14, 2025, 7 pages.

* cited by examiner

*Primary Examiner* — Brian W Jennison
(74) *Attorney, Agent, or Firm* — CANTOR COLBURN LLP (57) ABSTRACT

A welding setup includes an adjustable material feed system for a consumable welding wire. Speed sensors measure the speed of the wire progressing through the material feed system. A control module controls the material feed system to draw the wire into the material feed system and progress the wire to a working end of the welding setup. Speed data is sampled from the speed sensor during diagnostic duration and wire slip may be determined from the speed data and a reference speed.

20 Claims, 4 Drawing Sheets

PROCESS WIRE FEED DIAGNOSIS AND RECOVERY

INTRODUCTION

The subject disclosure relates to wire fed material joining systems such as used in welding and brazing operations. Wire feed systems are employed in stationary and moving workpiece welding and brazing processes. Wire feed systems may be fixtured, including robotically, for use with stationary or moving workpiece joining processes. In moving workpiece processes, the wire feed system is substantially static during joining. In stationary workpiece processes, working portions of the wire feed system may move along the workpiece. Wire feed systems may be unfixtured, for example in a portable system as may be used by a skilled tradesman at an in-situ set up. Material joining process quality and repeatability benefits from consistent wire feed.

Accordingly, it is desirable to provide a consistent and repeatable wire feed system and process.

SUMMARY

In one exemplary embodiment, an apparatus for wire feed diagnosis may include a welding setup having a material feed system for a consumable welding wire, a speed sensor for measuring the speed of the wire through the material feed system, and a control module controlling the material feed system to draw the wire into the material feed system and progress the wire to a working end of the welding setup, sampling speed data from the speed sensor during a predetermined diagnostic duration, and determining a wire slip fault from the speed data and a reference speed.

In addition to one or more of the features described herein, the reference speed may be based on a nominal wire speed for the material feed system.

In addition to one or more of the features described herein, the speed data may include speed data sampled at a first time and the reference speed may be based on speed data sampled prior to the first time.

In addition to one or more of the features described herein, determining the wire slip fault from the speed data and the reference speed may include comparing the speed data sampled at the first time to a weighted reference speed.

In addition to one or more of the features described herein, the reference speed may include speed data sampled at a second time prior to the first time.

In addition to one or more of the features described herein, the reference speed may include filtered speed data sampled prior to the first time.

In addition to one or more of the features described herein, the filtered speed data may include a running average of speed data sampled prior to the first time.

In addition to one or more of the features described herein, the material feed system may include a wire feed mechanism with an adjustable roller feed mechanism, and a roller feed mechanism adjustment actuator, wherein the control module may further control the adjustment actuator in response to the wire slip fault.

In addition to one or more of the features described herein, the welding setup may include one of a laser welding setup and a laser brazing setup.

In addition to one or more of the features described herein, the welding setup may include a MIG welding setup.

In addition to one or more of the features described herein, the welding setup may include a plastic welding setup.

In another exemplary embodiment, a method for operating a welding setup may include commanding, with a control module, a wire feed mechanism to progress a welding wire through a wire feed tip, periodically sampling, with the control module, speed data of the welding wire through the wire feed tip during a predetermined diagnostic duration, comparing, with the control module, the periodically sampled speed data of the welding wire to a reference speed, and determining, with the control module, a welding wire slip fault based on comparisons of the periodically sampled speed data of the welding wire to the reference speed.

In addition to one or more of the features described herein, the method may further include commanding an adjustment actuator, with the control module, to adjust the wire feed mechanism in response to the welding wire slip fault.

In addition to one or more of the features described herein, operating the welding setup may include operating the welding setup during production use on a workpiece.

In addition to one or more of the features described herein, the method may further include positioning the wire feed tip in process spatial proximity to a workpiece support.

In addition to one or more of the features described herein, the reference speed may be based on a nominal wire speed for the wire feed mechanism.

In addition to one or more of the features described herein, the periodically sampled speed data May include speed data sampled at a first time and the reference speed may be based on speed data sampled prior to the first time.

In addition to one or more of the features described herein, determining the welding wire slip fault based on comparisons of the periodically sampled speed data of the welding wire to the reference speed may include comparing the speed data sampled at the first time to a weighted reference speed.

In addition to one or more of the features described herein, the reference speed may include a running average of speed data sampled prior to the first time.

In yet another exemplary embodiment, a method for operating a welding setup may include commanding, with a control module, an adjustable roller feed mechanism to progress a welding wire through a wire feed tip, sampling, with the control module, speed data of the welding wire through the wire feed tip during a predetermined diagnostic duration, the speed data including speed data sampled at a first time, determining a reference speed based on speed data sampled at a second time prior to the first time, comparing, with the control module, the speed data sampled at the first time to a weighted reference speed, determining, with the control module, a welding wire slip fault based on comparisons of the speed data sampled at the first time to the weighted reference speed, and commanding, with the control module, an adjustment actuator to adjust the roller feed mechanism in response to the welding wire slip fault.

The above features and advantages, and other features and advantages of the disclosure are readily apparent from the following detailed description when taken in connection with the accompanying drawings.

BRIEF DESCRIPTION OF THE DRAWINGS

Other features, advantages and details appear, by way of example only, in the following detailed description, the detailed description referring to the drawings in which.

DETAILED DESCRIPTION

The following description is merely exemplary in nature and is not intended to limit the present disclosure, its application or uses.

In accordance with an exemplary embodiment, a welding or brazing system may employ a feed system for transporting brazing or welding material to a feed tip of a welding setup. Feed systems may be used for example in metal inert gas (MIG) welding, laser brazing, soldering and even plastic welding. Metal welding and brazing process wire may include silicon bronze, mild steel and aluminum material, among other metals and alloys. The process wire may be solid, metal-cored or flux-cored depending upon application. Plastic welding may employ many plastic materials such as thermoplastics like common polypropylene blends, ABS, nylon, polycarbonate and polyethylene in wire and ribbons. Wire as used herein is understood to mean any cross sectional profile of material used in a feed system for manufacturing processes, including welding or brazing and may, as the process dictates, include plastics, metals and alloys including conductive metals and alloys providing welding process electrode function. Welding as used herein may refer to any joining or filling process for workpiece materials whether melting of the workpiece material is effected or not. Essentially, any manufacturing process using a feed system for a wire, including plastics, may employ the methods and apparatus set forth in the present disclosure. Examples of such feed system use include welding or brazing processes using a feed system for a consumable welding wire, including metals, alloys and plastics.

Figure 1:
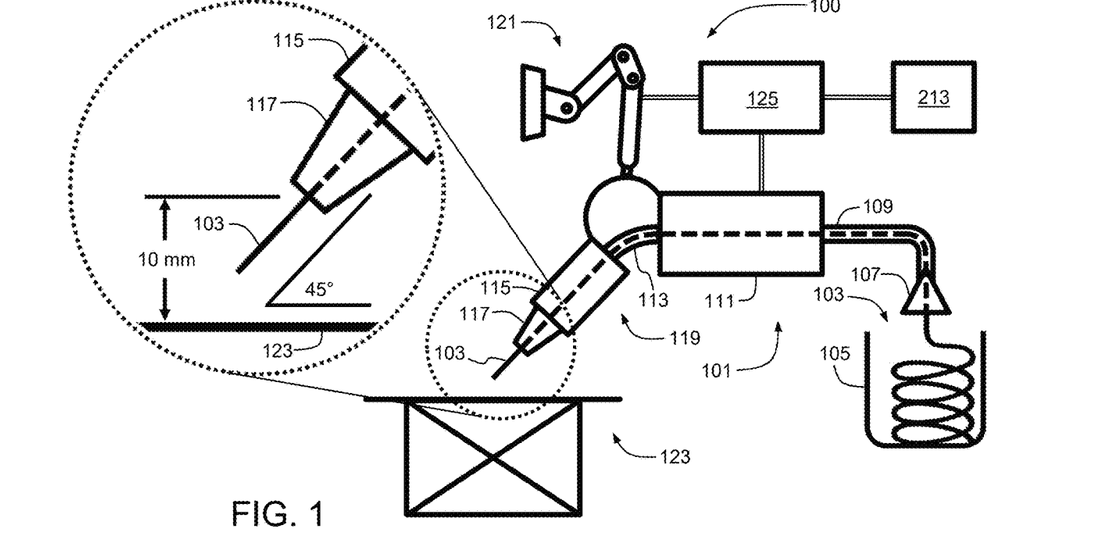
FIG. 1 illustrates an exemplary welding setup, in accordance with the present disclosure.

FIG. 1 illustrates an exemplary welding setup 100 suitable for implementing the methods and apparatus in accordance with the present disclosure. A material feed system 101 may include bulk material such as a welding wire 103 that may be contained in and dispensed from a wire feed barrel 105. Alternatively, wire may be contained on, and dispensed from, a spool, or welding wire may be in the form of welding rods, for example. Using a wire feed barrel 105 as exemplary, the wire may be guided out of the barrel through an inlet guide 107 and into a closed guide tube 109 or guided such as by pulleys, rollers, guides or functional equivalents.

At least one wire feed mechanism 111 draws the wire out of the barrel 105 through the guide tube 109 and into the feed mechanism 111. The feed mechanism 111 advances the wire through any additional guide tube 113 to a torch body 115 including a wire feed tip 117 at a terminal end 119 of the welding setup 100. Guide tubes located before the feed mechanism 111 may be referred to as being on the inlet side. Likewise, guide tubes located after the feed mechanism 111 may be referred to as being on the outlet side. Guide tubes may have roller liners which may regularly be replaced or reversed. Torch body 115 as used herein refers to the working end of a welding setup 100 whereat workpiece welding is accomplished via heat application, for example, from electric current, flame, hot gas, laser or other sources. The feed mechanism 111 and other terminal portions (e.g., guide tube 113, torch body 115, feed tip 117) of the welding setup 100 may be located on a robot 121 or other moveable or static fixturing. The terminal end 119 of the welding setup 100 may be adjacent to a workpiece support 123 for a workpiece (not shown). The welding setup 100 may include another feed mechanism intermediate the barrel 105 and the feed mechanism 111.

Electronic control of the welding setup 100 may be handled by a control module 125. As used herein, control module, module, control, controller, control unit, electronic control unit, processor and similar terms mean any one or various combinations of one or more of Application Specific Integrated Circuit(s) (ASIC), electronic circuit(s), central processing unit(s) (preferably microprocessor(s)) and associated memory and storage (read only memory (ROM), random access memory (RAM), electrically programmable read only memory (EPROM), hard drive, etc.) or microcontrollers executing one or more software or firmware programs or routines, combinational logic circuit(s), input/output circuitry and devices (I/O) and appropriate signal conditioning and buffer circuitry, high speed clock, analog to digital (A/D) and digital to analog (D/A) circuitry and other components to provide the described functionality. A control module may include a variety of communication interfaces including point-to-point or discrete lines and wired or wireless interfaces to networks including wide and local area networks, and in-plant and service-related networks. Functions of the control module as set forth in this disclosure may be performed in a distributed control architecture among several networked control modules. Software, firmware, programs, instructions, routines, code, algorithms and similar terms mean any controller executable instruction sets including calibrations, data structures, and look-up tables. A control module has a set of control routines executed to provide described functions. Routines are executed, such as by a central processing unit, and are operable to monitor inputs from sensing devices and other networked control modules and execute control and diagnostic routines to control operation of actuators. Routines may be executed at regular intervals during ongoing engine and vehicle operation. Alternatively, routines may be executed in response to occurrence of an event, software calls, or on demand via user interface inputs or requests. The control module 125 may electronically communicate with robot 121 and the feed mechanism 111 as described further herein. The control module may also provision human machine interfacing and interaction through any suitable human-machine interface (HMI) device 213 including, for example, touch and non-touch displays, LCD display and input devices, wired and wireless handheld personal devices or tablets, keyboards, mice, pens, etc.

Figure 2:
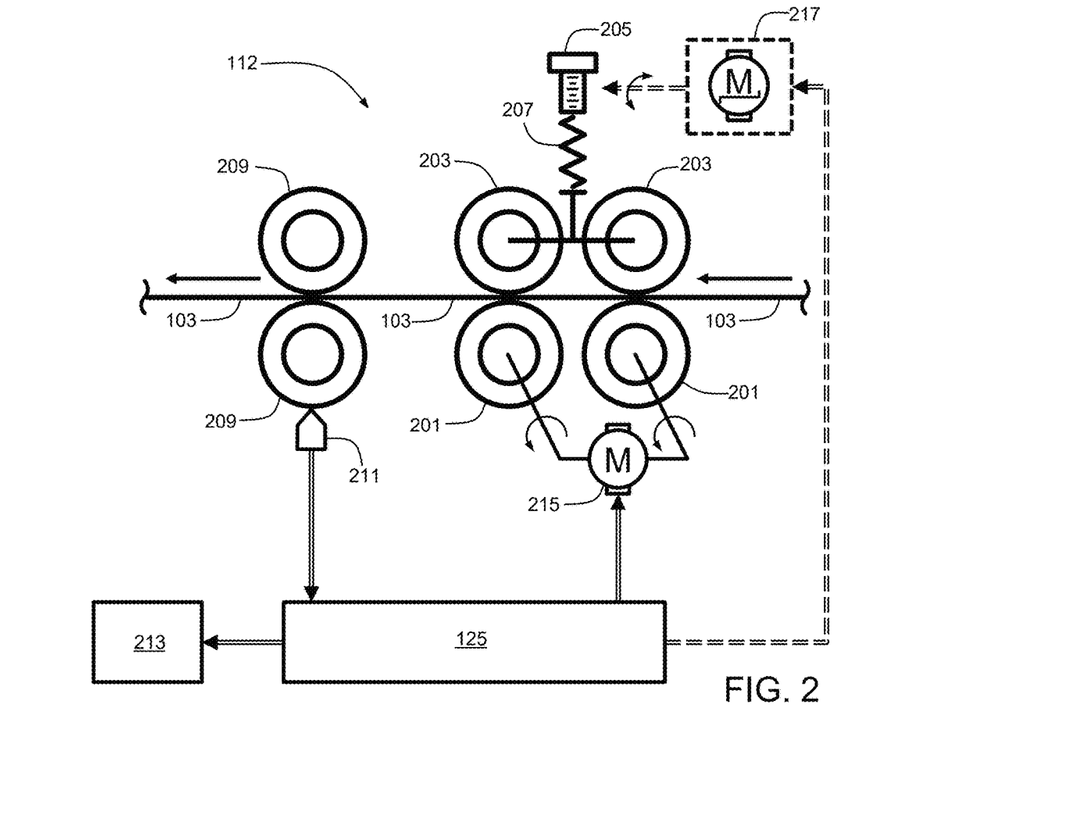
FIG. 2 illustrates a schematic of an exemplary roller feed mechanism, in accordance with the present disclosure.

With additional reference to FIG. 2, the feed mechanism 111 may have an adjustable roller feed mechanism 112 including at least one drive roller 201 and at least one opposing tension setting idler roller 203. The exemplary embodiment illustrates two drive rollers 201 and two corresponding idler rollers 203. The drive rollers 201 may be driven by an electric drive motor 215 in accordance with control signals from control unit 125. The wire 103 may be pinched between the drive rollers 201 and the idler rollers 203. The drive rollers 201 may be smooth or grooved to provide greater surface contact with the wire. Greater surface friction may be accomplished by varying degrees of smoothness in the surface finish of the rollers. Idler rollers 203 may provide pinching force to establish a contact pressure of the wire 103 against the drive roller 201. The force that the idler rollers 203 provide may be adjusted, for example, with a screw 205 adjustably applying force directly or through a spring mechanism 207. Screw 205 may be manually adjusted by an operator or may be adjusted in accordance with signals from the control module 125 commanding, for example, a stepper motor 217 or other roller feed mechanism 112 adjustment actuator. The drive rollers 201 are driven by a drive motor 215 to draw the wire 103 from the barrel 105 through inlet side guide tube 109 and advance the wire through any additional outlet side guide tube 113 to a torch body 115 feed tip 117 at a terminal end 119 of the welding setup 100. After the rollers 201, 203 in the direction of the wire feed are a pair of opposing tachometer rollers 209 between which the wire 103 progresses. One of the tachometer rollers 209 may drive a rotation sensor 211 from which wire speed through the feed tip 117 (feed speed) may be determined. The control module therefore may be configured to control the drive motor 215 to draw and progress the wire 103 to and through the feed tip 117 of the torch body 115 and to acquire data from the rotation sensor 211 which is directly proportional to the feed speed of the wire 103. The control module may also be configured to control the stepper motor 217 and hence the pinching force exerted on the wire 103 between the drive rollers 201 and the idler rollers 203.

Figure 3:
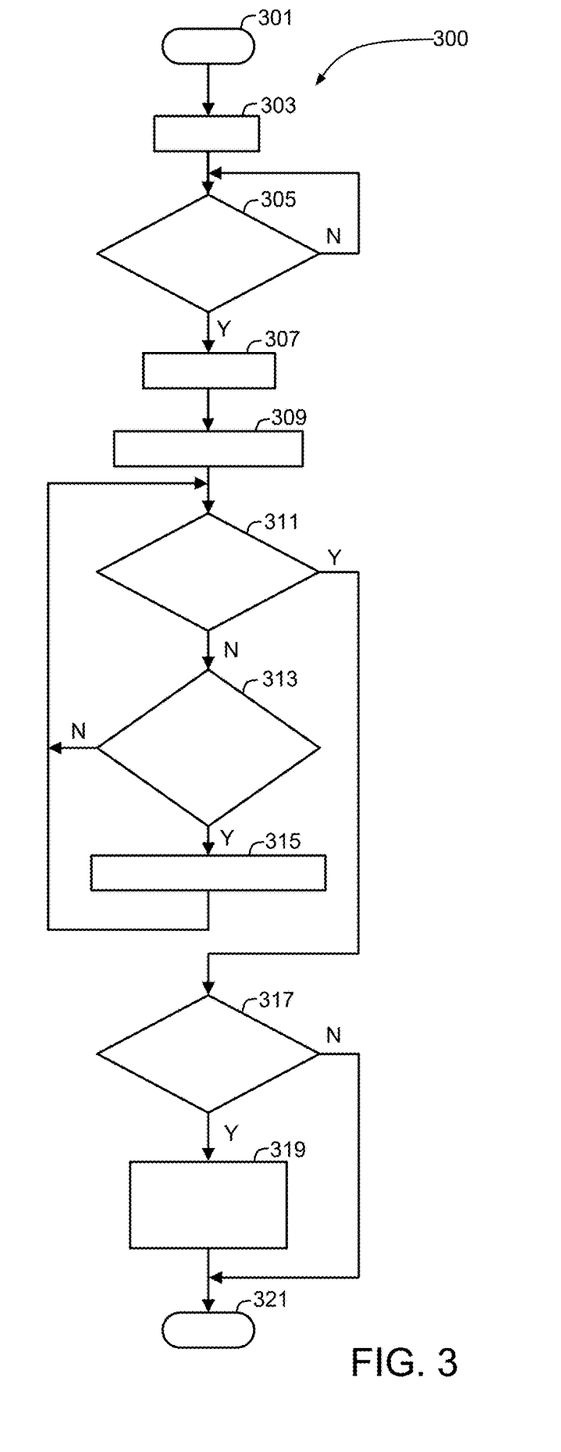
FIG. 3 illustrates a process flow routine of an exemplary implementation of a wire feed diagnostic method, in accordance with the present disclosure.

An exemplary diagnostic method for wire slippage at the drive rollers 201 may include a controller automated process for operating the feed mechanism 111, acquiring wire speed data, and determination of unacceptable slip requiring operator or automated intervention and adjustment of the feed mechanism 111 or other service. FIG. 3 illustrates a process flow routine (routine) 300 of an exemplary implementation of a diagnostic method for wire slippage. The various number labeled tasks represented in the routine 300 may be embodied in executable code within control module 125 of FIGS. 1 and 2. The routine 300 may be executed as a check on operation of an existing welding setup 100, for example as part of regularly scheduled preventive maintenance in a manufacturing environment. The routine 300 may be executed as a calibration aid when the type of welding processes utilizing the welding setup 100 are altered or changed, when guide tube 109, 113 liners are reversed or replaced, or when rollers 201, 203, 209 or other material feed system 101 components are removed, replaced, adjusted or serviced. The routine 300 may be executed periodically during a welding process as a run time diagnostic tool for providing operator notification or running adjustment of the wire contact pressure via the stepper motor 217 for example. The tasks illustrated in the routine 300 may be executed in the order and manner illustrated or may be executed in alternative orders or simultaneously, the routine 300 being exemplary.

Figure 4:
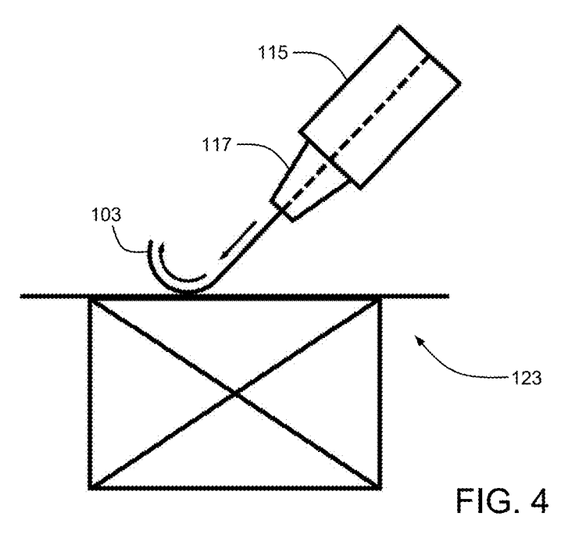
FIG. 4 schematically illustrates a proper wire feed for a wire feed diagnostic, in accordance with the present disclosure.

The routine 300 is entered at 301 and first initializes including clearing or populating memory locations and registers to establish initial settings, variables and calibrations as required 303. At 305, entry conditions required to proceed with further tasks of the routine 300 may be checked or established. For example, an operator may be required to run through a punch list of setup requirement or instructions via the HMI device 213. Such setup requirements may include visual and physical checks of the wire 103 routing, weld energy lock out, and proper positioning of the torch body 115 and feed tip 117. Some of the entry conditions, such as proper positioning of the torch body 115 and feed tip 117 may be controlled by the control module 125 and confirmed via robot 121 via the control module 125 or confirmed through production environment vision systems, for example. In one embodiment, the torch body 115 and feed tip 117 are positioned to substantially the distance and feed angle of the welding process to be carried out. Such positioning may be referred to as process spatial proximity and is understood to refer to any rational positioning of the torch body 115 and feed tip 117. In the present embodiment, as shown in the inset of FIG. 1, the feed tip 117 may be spaced about 10 mm from the workpiece support 123 and the feed angle may be about 45 degrees. Process spatial proximity may include other spacing and angle combinations. Until the entry conditions are satisfied, the routine 300 may remain in a wait state. When the entry conditions are satisfied, the routine progresses to 307 whereat the feed mechanism 111 drive motor 215 may be commanded by the control module 125 to feed the wire 103 for a predetermined duration, for example 8 to 10 seconds. FIG. 4 schematically illustrates a proper wire feed for the present diagnostic wherein the wire 103 exits the feed tip 117 at the end of the torch body 115, continuously contacts the workpiece support 123 as it feeds out, and freely curls away from the workpiece support 123. Data acquisition is enabled at 309 to periodically collect speed of the tachometer rollers 209 from the rotation sensor 211 during the wire feed.

A determination is made at 311 whether to end the routine based on the predetermined duration of wire feed having expired. When the wire feed duration has ended, the routine progresses to 317. When the wire feed duration has not ended and the routine is to continue feeding wire and acquiring speed data, the routine progresses to 313. At 313 a wire slip evaluation is performed. In the present example, speed of the tachometer rollers at a current sample time (t) is designated as Tach (t). The speed Tach (t) of the tachometer rollers at a current sample time is compared with a reference speed threshold metric. In the present embodiment, the metric is a weighted reference speed designated as Tach_Ref. In the present embodiment, Tach_Ref is the speed of the tachometer rollers at a prior sample time. In the present embodiment, the prior sample time is (t−1) and Tach_Ref is the most recent prior sampled tachometer roller speed. Thus, in the present embodiment, the reference speed, Tach_Ref, is not a static calibration value; rather, Tach_Ref may vary as a function of temporally recent prior speed samples. In the present embodiment, the weight applied to the reference speed Tach_Ref is 0.9. Thus, it is appreciated that in the present embodiment a speed Tach (t) of the tachometer rollers at a current sample time that is less than 90% of the most recent prior sampled tachometer roller speed Tach_Ref is determined to indicate a wire slippage event. Other prior sample times may be used in determining the reference speed Tach_Ref. Other weights less than one may be applied to the reference speed Tach_Ref. Factors influencing the selection of prior sample times, weights may include sampling frequency, feed tip 117 angle, wire feed speed, wire material selection, and ambient temperature, among others. In alternate embodiments, the reference speed Tach_Ref may be set to a static value. The static value may be related to a nominal or target wire speed for the material feed system 101 and may be, for example, a value within a rational range (e.g., +/−5%) of a nominal process wire speed. In alternate embodiments, the reference speed Tach_Ref may be a running average of temporally recent prior sampled tachometer roller speeds or other filtered value of temporally recent prior sampled tachometer roller speeds. In alternate embodiments, the wire slip evaluation at 313 may include multiple criteria including comparisons of speed Tach (t) of the tachometer rollers at a current sample time to multiple metrics including, but not limited to, recent prior tachometer roller speeds, a running average or other filters thereof, and nominal or target wire speed as set forth herein.

When the wire slip evaluation performed at 313 does not indicate a wire slippage event, the routine returns to 311 for a subsequent iteration in accordance with the next sampling time. When the wire slip evaluation performed at 313 does indicate a wire slippage event, the routine progresses to 315 whereat a wire slip event counter, Slip_Count, is incremented. From 315, the routine 300 returns to 311 for a subsequent iteration in accordance with the next sampling time.

The routine progresses from 311 to 317 when a determination to end the routine based on the predetermined duration of wire feed having expired is made. At 317 a determination is made, based on the data acquired during the wire feed duration, whether a wire slip fault is indicated and requires attention. When a wire slip fault is not indicated at 317, the routine 300 exits at 321. In the present embodiment, a Slip_Count more than a predetermined threshold is considered excessive and indicates a wire slip fault. The threshold may vary with the duration of wire feed and in one embodiment may be set as a function of the wire feed duration. A wire slip fault indicated at 317 progresses the routine 300 to 319 whereat a fault flag or diagnostic code may be set, notifications made (e.g., through HMI device 213) and remediation steps taken. Remediation may require manual operator intervention or service such as adjustments to the screw 205 or roller replacement, clearing of diagnostic flags and codes, calibrations, and execution of the routine 300 to implement the diagnostic method to validate the remediation.

Figure 5:
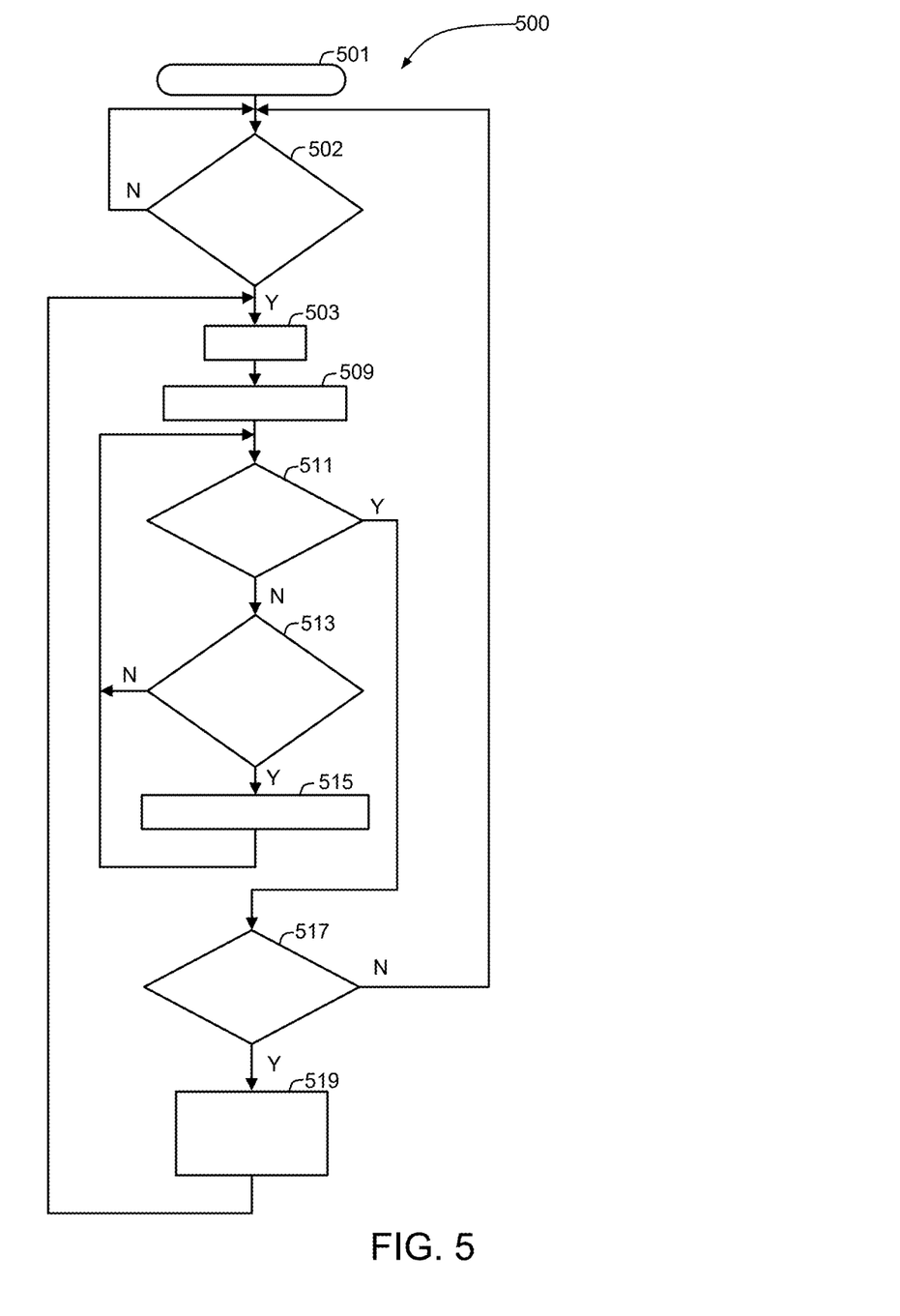
FIG. 5 illustrates a process flow routine of an exemplary implementation of a wire feed diagnostic method, in accordance with the present disclosure.

FIG. 5 illustrates a process flow routine (routine) 500 of an exemplary implementation of a diagnostic method for wire slippage during a welding process run. The various number labeled tasks represented in the routine 500 may be embodied in executable code within control module 125 of FIGS. 1 and 2. The routine 500 may be executed as a check on operation of an existing welding setup 100, during production use of the welding setup 100 on a workpiece in a manufacturing environment. The routine 500 may be executed periodically during a welding process as a diagnostic and adjustment tool for providing operator notification or running adjustment of the wire contact pressure via the stepper motor 217 for example. The tasks illustrated in the routine 500 may be executed in the order and manner illustrated or may be executed in alternative orders or simultaneously, the routine 500 being exemplary.

The routine 500 executes in the background of an active welding process 501 and may be periodically called in accordance with a diagnostic interrupt at 502. Until called, the routine 500 may remain in an interrupt wait state at 502. Once called, the routine initializes at 503 including clearing or populating memory locations and registers to establish initial settings, variables and calibrations as required. Data acquisition may next be enabled at 509 to collect speed of the tachometer rollers 209 from the rotation sensor 211 during ongoing wire feed associated with the running welding process.

A determination is made at 511 whether to end the routine based on a predetermined duration of diagnosis having expired. When the diagnosis duration has ended, the routine progresses to 517. When the diagnosis duration has not ended and the routine is to continue acquiring speed data, the routine progresses to 513. At 513 a wire slip evaluation is performed. The wire slip evaluation performed at 513 may be substantially like the wire slip evaluation described herein in conjunction with the routine 300 at 311 in FIG. 3 relying upon the speed of the tachometer rollers at a current sample time (t) designated as Tach (t) and a weighted reference speed designated as Tach_Ref.

When the wire slip evaluation performed at 513 does not indicate a wire slippage event, the routine returns to 511 for a subsequent iteration in accordance with the next sampling time. When the wire slip evaluation performed at 513 does indicate a wire slippage event, the routine progresses to 515 whereat a wire slip event counter, Slip_Count, is incremented. From 515, the routine 500 returns to 511 for a subsequent iteration in accordance with the next sampling time.

The Routine progresses from 511 to 517 when a determination to end the routine is made based on the predetermined diagnosis duration having expired. At 517 a determination is made, based on the data acquired during the diagnosis duration, whether a wire slip fault is indicated and requires attention. When a wire slip fault is not indicated at 517, the diagnosis is complete and the routine 500 returns to an interrupt wait state at 502. In the present embodiment, a Slip_Count more than a predetermined threshold is considered excessive and indicates a wire slip fault. The threshold may vary with the diagnosis duration and in one embodiment may be set as a function of the diagnosis duration. A wire slip fault indicated at 517 progresses the routine 500 to 519 whereat a fault flag or diagnostic code may be set, notifications made (e.g., through HMI device 213) and remediation steps taken. Remediation may require taking the welding process offline and manual operator intervention or service such as adjustments to the screw 205 or roller replacement, clearing of diagnostic flags and codes, recalibration, and execution of the routine 500 to implement the diagnostic method to validate the remediation. In the present embodiment and application, remediation includes running adjustment of the wire contact pressure via the stepper motor 217 which may be a predetermined incremental increase in wire contact pressure. After the stepper motor 217 incrementally adjusts the wire contact pressure, the routine 500 progresses back to 503 to perform another iteration of the diagnostic which serves as a running process validation of the remediation task.

Figure 6:
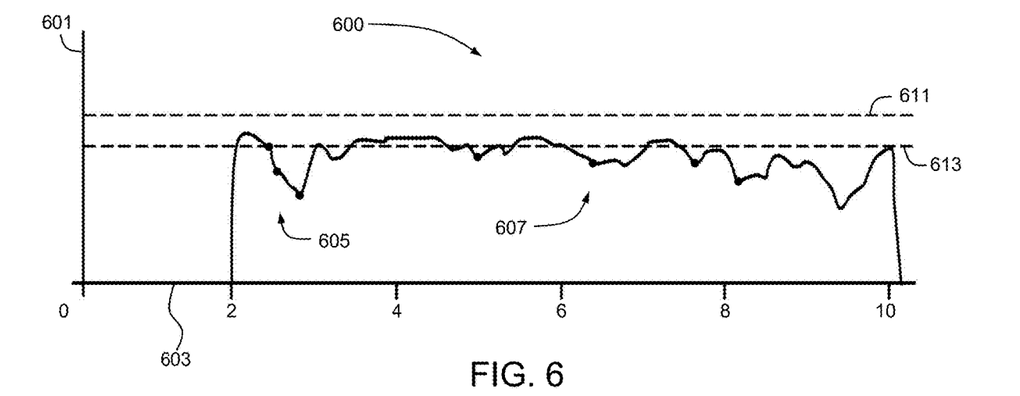
FIG. 6 illustrates a plot of an exemplary set of wire feed diagnostic data, in accordance with the present disclosure.

With reference to FIG. 6, an exemplary set of data illustrating the wire feed diagnosis in accordance with the present disclosure is shown in graph 600. Time is shown plotted in seconds along the horizontal axis 603 and tachometer roller speed is shown plotted along the vertical axis 601. The intersection of the axes 601, 603 represents the zero origin of the respective data. A wire feed diagnostic routine is seen to begin at about the 2 second mark as appreciated from the rapid rise in wire feed speed (tachometer roller speed). The wire feed diagnostic routine is seen to end at about the 10 second mark as appreciated from the rapid drop in wire feed speed (tachometer roller speed). A nominal wire feed speed range is illustrated between an upper speed line 611 and a lower speed line 613 and is provided as a reference of rational wire feed speeds. A first relatively tight temporal grouping of three wire speed events is labeled 605 wherein each successive event may have been determined in accordance with the associated sampled wire feed speed being less than 90% of the immediately prior sampled wire feed speed. Subsequent to the grouping of events 605, the wire feed speed is seen recovering toward a nominal range. Such result of progressively lower wire feed speed events may indicate one type of intermittent process anomaly such as, for example, a wire bind caused by a failing guide tube. A second relatively distributed temporal grouping of four wire speed events is labeled 607 wherein subsequent to each event the wire feed speed recovers toward the nominal range. Each successive event may have been determined in accordance with the associated sampled wire feed speed being less than 90% of the immediately prior sampled wire feed speed. Such result of substantially nominal wire feed speeds with independent, intermittent slip events may indicate another type of process anomaly such as, for example, a worn drive rollers 201, worn idler rollers 203 or insufficient pinching force exerted on the wire 103 between the drive rollers 201 and the idler rollers 203.

While the above disclosure has been described with reference to exemplary embodiments, it will be understood by those skilled in the art that various changes may be made and equivalents may be substituted for elements thereof without departing from its scope. In addition, many modifications may be made to adapt a particular situation or material to the teachings of the disclosure without departing from the essential scope thereof. Therefore, it is intended that the present disclosure not be limited to the particular embodiments disclosed, but will include all embodiments falling within the scope thereof.

What is claimed is:

1. An apparatus for wire feed diagnosis, comprising:
    a welding setup including a material feed system for a consumable welding wire;
    a speed sensor for measuring the speed of the wire through the material feed system, the speed sensor comprising a pair of opposing tachometer rollers positioned to define a gap through which the wire is fed; and
    a control module comprising a memory, computer readable instructions, and one or more circuitry for executing the computer readable instructions, the computer readable instructions controlling the one or more circuitry to perform operations comprising:
        controlling the material feed system to draw the wire into the material feed system at a constant speed value and to progress the wire to a working end of the welding setup;
        sampling speed data from the speed sensor during a predetermined diagnostic duration; and
        determining a wire slip fault from the speed data and a reference speed comprising prior sampled speed data from the speed sensor, wherein determining the wire slip fault comprises determining that a current value of wire speed has dropped below a predetermined threshold tolerance of a previous value of wire speed.

2. The apparatus of claim 1 wherein the reference speed is based on a nominal wire speed for the material feed system.

3. The apparatus of claim 1 wherein the speed data comprises speed data sampled at a first time and the reference speed is based on speed data sampled prior to the first time.

4. The apparatus of claim 3 wherein determining the wire slip fault from the speed data and the reference speed comprises comparing the speed data sampled at the first time to a weighted reference speed.

5. The apparatus of claim 3 wherein the reference speed comprises speed data sampled at a second time prior to the first time.

6. The apparatus of claim 3 wherein the reference speed comprises filtered speed data sampled prior to the first time.

7. The apparatus of claim 6 wherein the filtered speed data comprises a running average of speed data sampled prior to the first time.

8. The apparatus of claim 1 wherein the material feed system comprises a wire feed mechanism with an adjustable roller feed mechanism, and a roller feed mechanism adjustment actuator, wherein the control module further controls the adjustment actuator in response to the wire slip fault.

9. The apparatus of claim 1 wherein the welding setup comprises one of a laser welding setup and a laser brazing setup.

10. The apparatus of claim 1 wherein the welding setup comprises a MIG welding setup.

11. The apparatus of claim 1 wherein the welding setup comprises a plastic welding setup.

12. A method for operating a welding setup, the method comprising:
    commanding, with a control module, a wire feed mechanism to progress a welding wire through a wire feed tip;
    periodically sampling, with the control module and from a speed sensor comprising a pair of opposing tachometer rollers positioned to define a gap through which the welding wire is fed, speed data of the welding wire through the wire feed tip during a predetermined diagnostic duration;
    comparing, with the control module, the periodically sampled speed data of the welding wire to a reference speed comprising prior sampled speed data from the speed sensor; and
    determining, with the control module, a welding wire slip fault based on comparisons of the periodically sampled speed data of the welding wire to the reference speed, wherein determining the wire slip fault comprises determining that a current value of wire speed has dropped below a predetermined threshold tolerance of a previous value of wire speed.

13. The method of claim 12, further comprising commanding an adjustment actuator, with the control module, to adjust the wire feed mechanism in response to the welding wire slip fault.

14. The method of claim 13, wherein operating the welding setup comprises operating the welding setup during production use on a workpiece.

15. The method of claim 12, further comprising positioning the wire feed tip in process spatial proximity to a workpiece support.

16. The method of claim 12 wherein the reference speed is based on a nominal wire speed for the wire feed mechanism.

17. The method of claim 12 wherein the periodically sampled speed data comprises speed data sampled at a first time and the reference speed is based on speed data sampled prior to the first time.

18. The method of claim 17 wherein determining the welding wire slip fault based on comparisons of the periodically sampled speed data of the welding wire to the reference speed comprises comparing the speed data sampled at the first time to a weighted reference speed.

19. The method of claim 17 wherein the reference speed comprises a running average of speed data sampled prior to the first time.

20. A method for operating a welding setup, comprising:
    commanding, with a control module, an adjustable roller feed mechanism to progress a welding wire at a constant speed value through a speed sensor comprising a pair of opposing tachometer rollers positioned to define a gap through which the wire is fed and out a wire feed tip;

sampling, with the control module and from the speed sensor, speed data of the welding wire through the wire feed tip during a predetermined diagnostic duration, the speed data including speed data sampled at a first time;

determining a reference speed based on speed data sampled at a second time prior to the first time;

comparing, with the control module, the speed data sampled at the first time to a weighted reference speed;

determining, with the control module, a welding wire slip fault based on comparisons of the speed data sampled at the first time to the weighted reference speed, wherein determining the wire slip fault comprises determining that the speed data sampled at the first time from the speed sensor has dropped below a predetermined threshold tolerance of the speed data sampled at the second time from the speed sensor; and commanding, with the control module, an adjustment actuator to adjust the roller feed mechanism in response to the welding wire slip fault.

\* \* \* \* \*